United States Patent
Dawson et al.

(10) Patent No.: US 7,650,440 B2
(45) Date of Patent: Jan. 19, 2010

(54) PERIPHERAL SUPPLIED ADDRESSING IN A SIMPLE DMA MODULE

(75) Inventors: Steven Dawson, Chandler, AZ (US); Willem Smit, Chandler, AZ (US); Maria Smit, legal representative, Chandler, AZ (US); Brian Boles, Mesa, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 135 days.

(21) Appl. No.: 11/736,348

(22) Filed: Apr. 17, 2007

(65) Prior Publication Data
US 2008/0028110 A1 Jan. 31, 2008

Related U.S. Application Data

(60) Provisional application No. 60/820,330, filed on Jul. 25, 2006.

(51) Int. Cl.
G06F 13/28 (2006.01)

(52) U.S. Cl. ............... 710/26; 365/230.01; 711/200; 711/220

(58) Field of Classification Search ............... 710/3, 710/26, 9; 711/200; 345/572
See application file for complete search history.

(56) References Cited

U.S. PATENT DOCUMENTS

| 5,056,010 | A | | 10/1991 | Huang | 364/200 |
|---|---|---|---|---|---|
| 5,422,884 | A | * | 6/1995 | Goertz | 370/475 |
| 5,712,999 | A | * | 1/1998 | Guttag et al. | 711/211 |
| 6,189,082 | B1 | | 2/2001 | Ramamurthy | 711/202 |
| 6,615,292 | B1 | * | 9/2003 | Sota | 710/22 |
| 6,769,055 | B1 | * | 7/2004 | Leung et al. | 711/220 |
| 2005/0254489 | A1 | * | 11/2005 | Jain et al. | 370/389 |

OTHER PUBLICATIONS

International Search Report and Written Opinion for PCT/US2007/074194 mailed Feb. 1, 2008.

* cited by examiner

*Primary Examiner*—Henry W. H. Tsai
*Assistant Examiner*—Elias Mamo
(74) *Attorney, Agent, or Firm*—King & Spalding L.L.P.

(57) ABSTRACT

A method of performing a direct memory access has the steps of selecting a peripheral device for performing a direct memory access through a direct memory access controller; providing a partial address by the peripheral device to the direct memory access controller; and forming the source or destination address by combining the partial address with selected bits from a source register within the direct memory access controller.

7 Claims, 6 Drawing Sheets

PERIPHERAL SUPPLIED ADDRESSING IN A SIMPLE DMA MODULE

CROSS-REFERENCE TO RELATED APPLICATIONS

This application claims the benefit of U.S. Provisional Application No. 60/820,330 filed on Jul. 25, 2006, entitled "PERIPHERAL SUPPLIED ADDRESSING IN A SIMPLE DMA", which is incorporated herein in its entirety.

TECHNICAL FIELD

The present application relates to a direct memory access (DMA) controller which allows flexible data transfers from a source to a destination.

BACKGROUND

Today's DMA controllers or module are used to transfer data, independently from the central processing unit (CPU), between, for example, two memory locations. Conventional DMA modules, however, are usually implemented without complex addressing modes. It is not possible to have the source or destination supply and address the DMA without significantly complicating the DMA module.

SUMMARY

According to one embodiment, one or more peripherals supply a portion of an address in RAM. A register in the DMA selects which bits of the peripheral address are used to address the RAM and which bits are provided by DMA channels. The addition of these addressing modes allows non-linear access of RAM. For example, message may be placed in specific locations such as RAM or in a dual port RAM buffer, or read from a specific location within the RAM or the dual port RAM buffer.

BRIEF DESCRIPTION OF THE DRAWINGS

A more complete understanding of the present disclosure and advantages thereof may be acquired by referring to the following description taken in conjunction with the accompanying drawings wherein.

DETAILED DESCRIPTION

Figure 1:
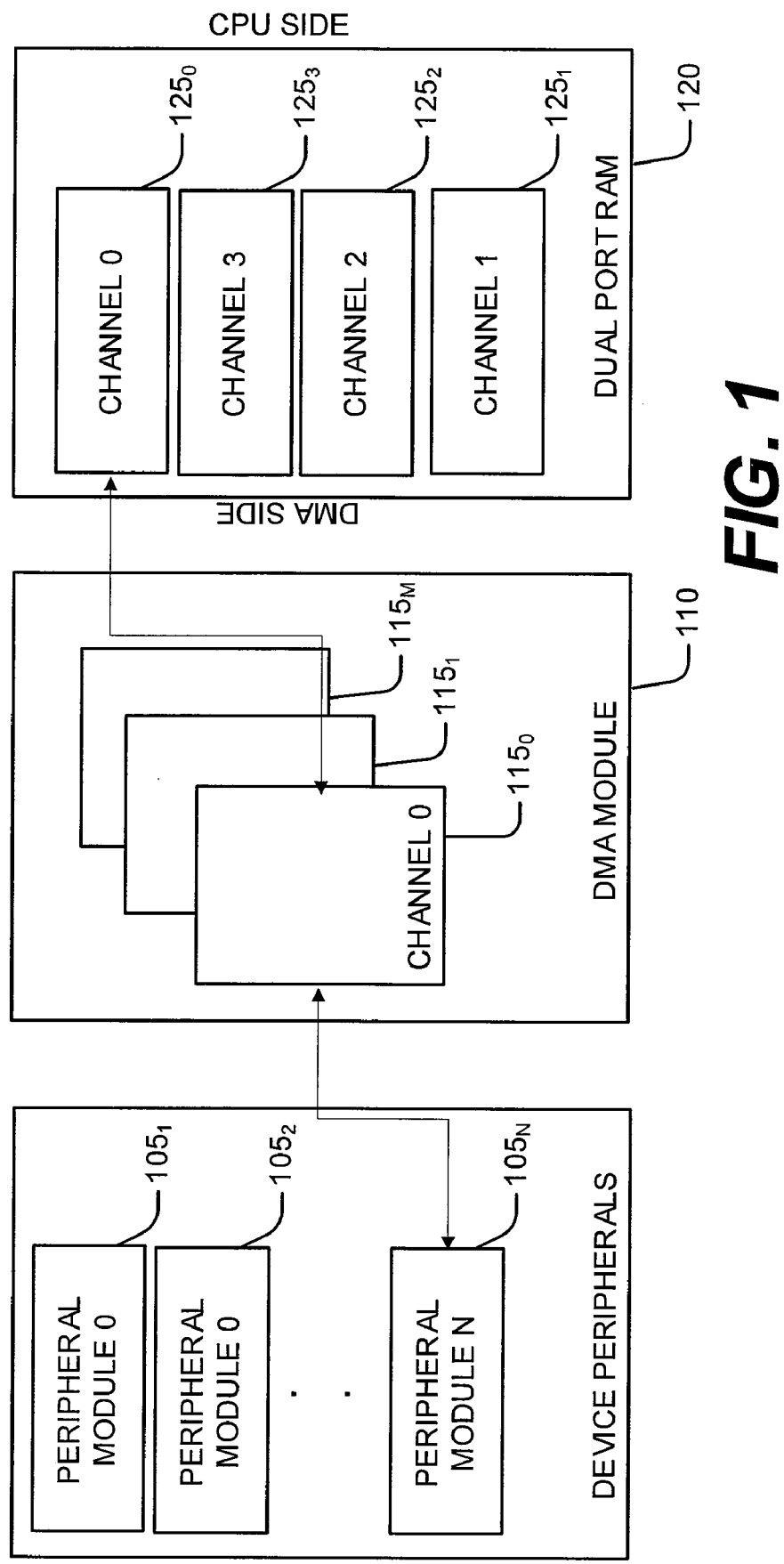
FIG. 1 is a schematic block diagram of peripherals, DMA, and memory.

Thus, according to an embodiment, a method of performing a direct memory access may comprise the steps of selecting a peripheral device for performing a direct memory access through a direct memory access controller; providing a partial address by the peripheral device to the direct memory access controller; and forming the destination address by combining the partial address with selected bits from a source register within the direct memory access controller.

According to an embodiment, the partial address can be the least significant bits of the source and/or destination address. According to an embodiment, the number of bits of the partial address may depend on the selected peripheral device. According to an embodiment, the number of bits of the partial address can be programmable. According to an embodiment, the respective bits of the partial address can be selected automatically when selecting the peripheral device.

According to another embodiment, a method of performing a direct access to a memory, may comprise the steps of configuring a channel to receive a plurality of address bits from a peripheral device; and selectively choosing a location in the memory based on a plurality of address bits from a peripheral device and a plurality of address bits from a source or destination register.

According to an embodiment, a control register may determine the address bits that the channel should use from the plurality of address bits from the peripheral device. According to an embodiment, the plurality of address bits from a peripheral device may provide a channel offset in the location of the memory. According to an embodiment, the source registers may supply the start and end address of the channel. According to an embodiment, in the source registers may be DMA setup registers. According to an embodiment, the control register can be a user configurable register. According to an embodiment, the user configurable register can be configured using software. According to an embodiment, According to an embodiment, the control register may determine the plurality of address bits of the peripheral address to use in the source or destination address.

According to another embodiment, a method of accessing a memory using direct memory access (DMA), may comprise the steps of selecting a plurality of address bits from a peripheral device; selecting a plurality of address bits from a pointer register; inserting the selected plurality of address bits from the peripheral device and the plurality of address bits from the pointer into a multiplexer; and choosing a memory location at least partially based on the plurality of address bits selected by the multiplexer.

According to an embodiment, the memory location can be a source or destination address path. According to an embodiment, the pointer register can be a register in a DMA channel. According to an embodiment, the multiplexer may select a partial address and the memory location is formed by the partial address and other bits from the pointer register.

According to another embodiment, a direct memory access (DMA) controller, may comprise a register for providing a first pointer address; an input receiving a partial address from a peripheral device; and a merger for merging the partial address with bits provided by the register to form a second pointer address.

According to an embodiment, the DMA controller may further comprise a multiplexer receiving the partial address and a plurality of bits from said register. According to an embodiment, the DMA controller may further comprise a control register for controlling said multiplexer. According to an embodiment, the DMA controller may further comprise a first multiplexer receiving a plurality of partial addresses from a plurality of peripheral devices. According to an embodiment, the DMA controller may further comprise a second multiplexer receiving a selected partial address from said first multiplexer and a plurality of bits from said register. According to an embodiment, the DMA controller may further comprise a plurality of multiplexers each receiving a plurality of partial addresses from a plurality of peripheral devices and a plurality of bits from said register; and a control register for controlling said plurality of multiplexers. According to an embodiment, the DMA controller may further comprise a plurality of control register and a control multiplexer for selecting control signals from said plurality of control registers to control said plurality of multiplexers, wherein each control register is associated with a peripheral device.

Referring now to the drawings, the details of exemplary embodiments of the present invention are schematically illustrated. Like elements in the drawings will be represented by like numbers, and similar elements will be represented by like numbers with a different lower case letter suffix.

FIG. 1 shows an example system including three major components: device peripherals, a DMA module 110, and a dual port RAM module 120. The device peripherals include peripheral modules $105_1 \ldots N$. Peripherals are either generators of data (e.g., UART receive) or consumers of data (e.g., UART transmit), in other words they receive and/or transmit data.

The DMA module 110 includes channels $115_{0 \ldots M}$. Each channel is typically configured to connect one of the peripheral modules $105_{1 \ldots N}$ to a range of data inputs of the dual port RAM module 120. However, in other embodiments, any other type of memory could be used. On certain stimulus, the DMA module 110 fetches data from the source, one of the peripheral modules $115_{0 \ldots M}$, and writes the data to the destination, for example, the dual port RAM 120. For example, a data block transfer sets the start and end source addresses as well as the start and end destination addresses in the DMA module. Upon start of transfer, the DMA module sets the source address register with the source start address and the destination address register with the destination start address and fetches the first data from the source using the source address register. This data is then transferred to the destination using the destination address register. Both, source and destination address register are then incremented and the process repeats until the source address register reaches the destination end address.

To prevent any stalling of the CPU, the arrangement according to the embodiment in FIG. 1 comprises a dual port RAM. The dual port RAM module 120 includes a DMA side and a CPU side. The separation of CPU and DMA address/data busses prevents CPU performance from being degraded during times of high DMA activity. The user may configure each DMA channel $115_{0 \ldots M}$ to point to a given address range within the dual port RAM 120. As mentioned above, other embodiments may include other types of memory.

Figure 2:
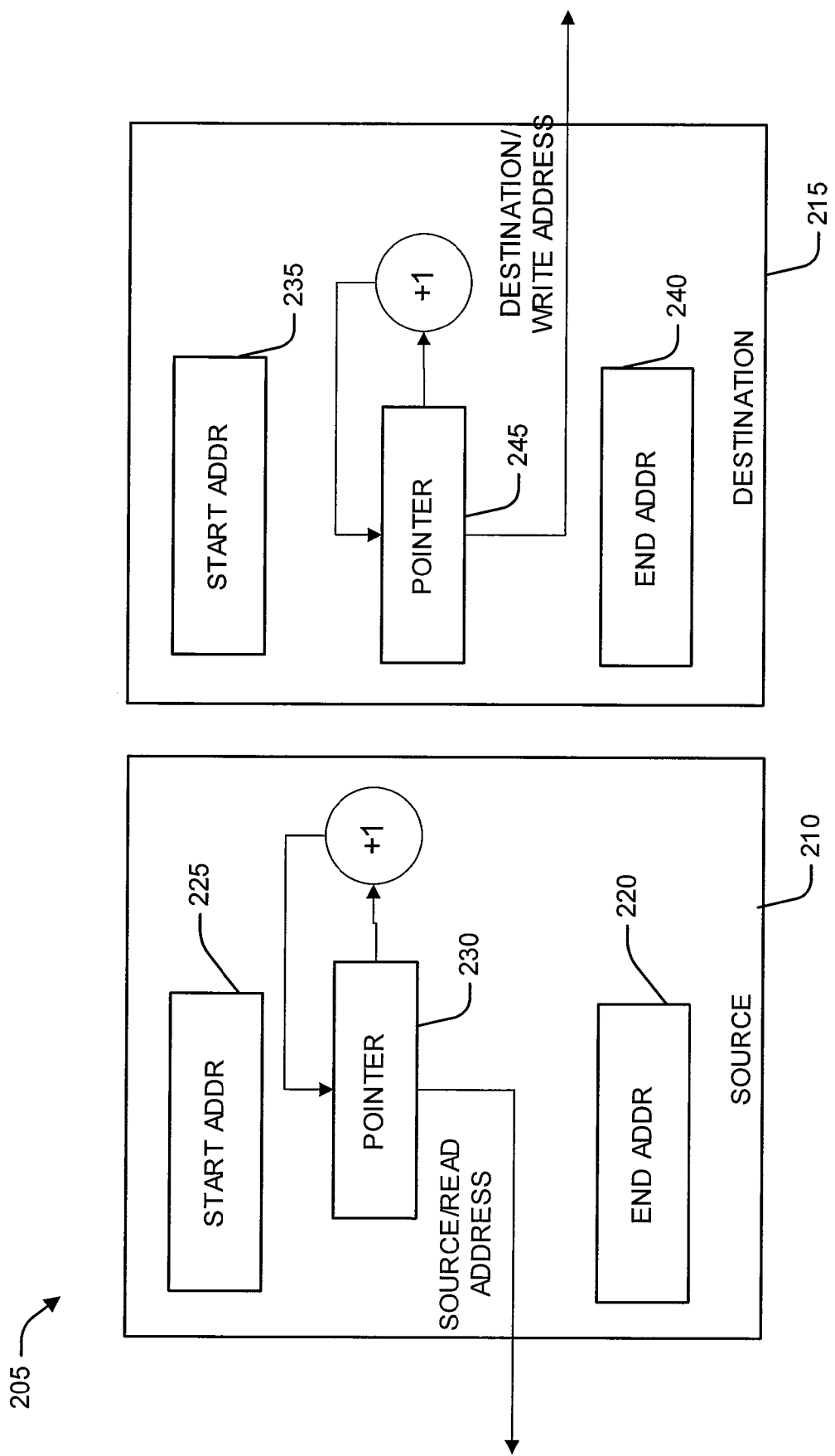
FIG. 2 is a schematic block diagram of a DMA register.

An example DMA channel, shown generally at 205, is depicted in FIG. 2. The DMA channel 205 includes a source side 210 and a destination side 215. The source side 210 includes a start address register 225, an end address register 220, and a pointer 230. The destination side includes a start address 235, and end address 240, and a pointer 245. The pointer 230 outputs a portion of a source/read address. The pointer 245 outputs at least a portion of a destination write address. In some example implementations each of the pointers 230 and 245 store a word. In one example implementations, a single word having a width that is equal to the system width is transferred from the channel source pointer to the channel destination pointer. The source pointer 230 is updated to point to the next word after the transfer completes, unless the end of the buffer is reached. In that case, the source pointer 230 can again be loaded with the start address 225.

Standard DMA memory access may not be sufficient for more complex peripherals (e.g., a controller area network (CAN)) or peripherals with more complex addressing modes, such as multi-channel analog to digital converters. For example, certain peripherals may require specifying an address within a DMA channel to be used as a source or destination for data. For peripherals that have multi-word message sizes or would like to access DMA memory in a non-linear mode it would be useful to be able to partition the DMA memory into "message" sized blocks and have the peripheral identify the order in which to access these blocks. For example, in the CAN each message is comprised of 8×16 word blocks. In the example given in Table 1, the four message that are in the DMA queue are transmitted starting with buffer 0, followed by buffer 2, buffer 1, and finally buffer 3.

TABLE 1

Non Linear addressing of Multi-word blocks of DMA Memory

| Buffer | Address | Message Information | Transmit Order |
|---|---|---|---|
| 0 | 0-7 | Priority 3 (Highest) | 1 |
| 1 | 8-F | Priority 2 | 3 |
| 2 | 10-17 | Priority 3 (Highest) | 2 |
| 3 | 18-1F | Priority 1 (Lowest) | 4 |

TABLE 2

Non-Linear Loading of Sequential Byte/Word Data

| DMA Memory Address | A2D Samples (Time) | Linear DMA Implementation | Peripheral Selectable Loading of DMA Space |
|---|---|---|---|
| 0 | SAMP1, CH1 | SAMP1, CH1 | SAMP1, CH1 |
| 1 | SAMP1, CH2 | SAMP1, CH2 | SAMP2, CH1 |
| 2 | SAMP2, CH1 | SAMP2, CH1 | |
| 3 | SAMP2, CH2 | SAMP2, CH2 | |
| 4 | | | SAMP1, CH2 |
| 5 | | | SAMP2, CH2 |
| 6 | | | |
| 7 | | | |

The peripheral can perform these functions using a simple DMA module as follow: the DMA is set up to allow selected address bits to be derived by the peripheral in question. For example, in Table 2 address bits 2:0 will be derived by the peripheral which give the channel offset, while the most significant bits of the address are supplied by the DMA setup registers which define the start and end address of the channel. This may be implemented using a register that would describe which address bits the DMA channel should take from the peripheral attached to the DMA channel.

Table 3 shows how a RAM having can be partitioned into, for example, four different sections. In this example, each channel is assigned to a different peripheral. In a RAM with a capacity of, for example, 512 bytes and, thus, 9 address bits $A_0$-$A_8$, the following scheme could be applied. Channel 0 is assigned to the SPI serial interface and uses a buffer of 256 bytes. Thus, the lower 8 bits $A_0$-$A_7$ of the RAM address will be provided by the peripheral and the MSB $A_8$ (set to "0") is provided by the destination address register. Channel 1 is assigned to the analog to digital converter and requires to address 8 bytes in the RAM. In this example, the lowest 3 bits $A_0$-$A_2$ are provided by the peripheral and the remaining bits $A_3$-$A_8$ (set to "100000") from the destination address register. The serial interface UART requires a buffer of, for example 216 bytes. Thus, address bits $A_0$-$A_7$ (using an offset of "0001000") are provided by the peripheral and the MSB bit $A_8$ (set to "1") by the destination address register. Finally, 32 bits are used for the CAN bus in the memory and, therefore, bits $A_0$-$A_4$ are provided by the peripheral and bits $A_5$-$A_8$ (set to "1111") by the destination register.

TABLE 3

| Channel | Address | Module |
| --- | --- | --- |
| 0 | 0-FF | SPI Transmit |
| 1 | 100-107 | ADC |
| 2 | 108-1DF | UART |
| 3 | 1E0-1ff | CAN |

Figure 3:
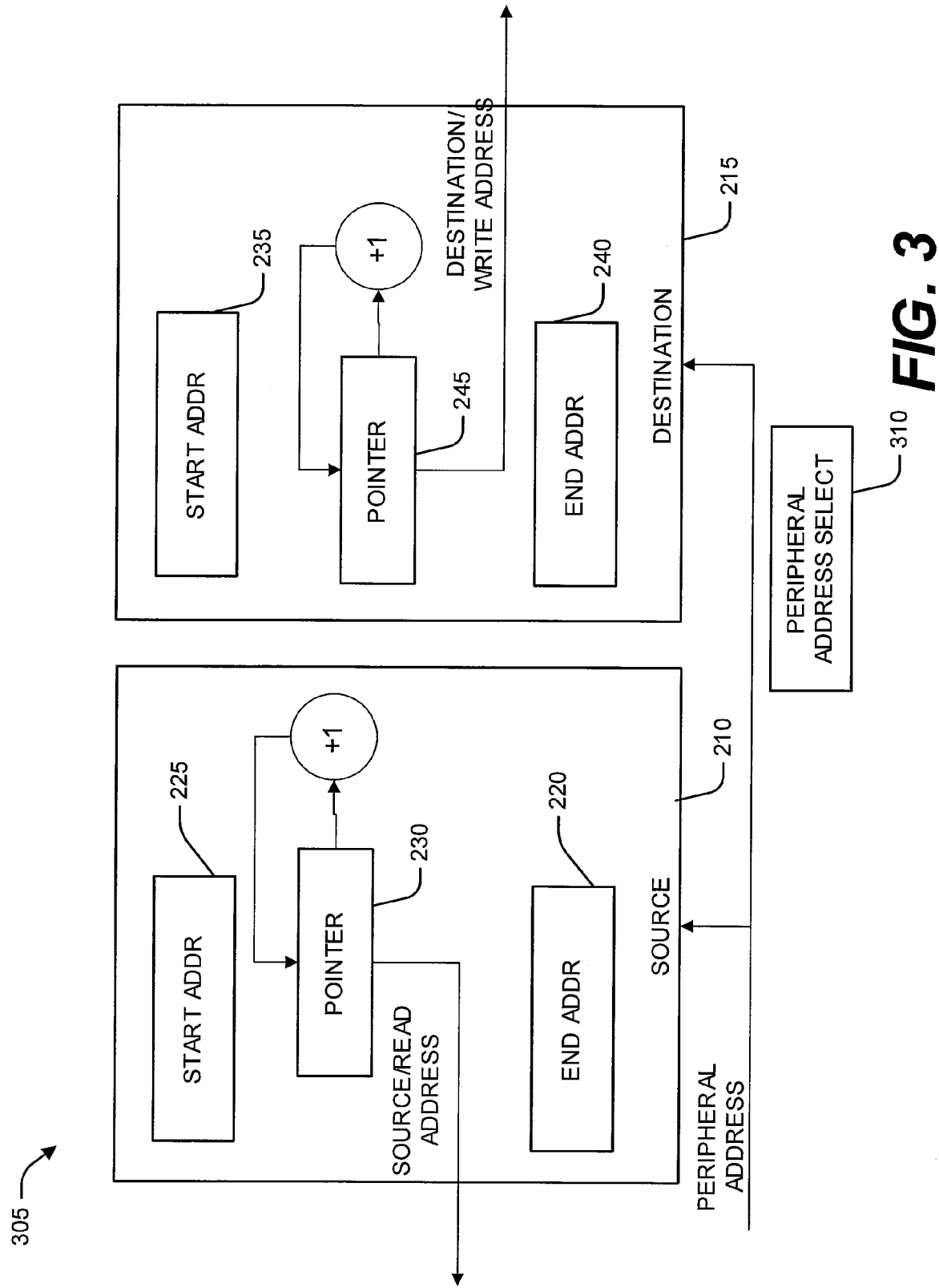
FIG. 3 is a schematic block diagram of a DMA channel configured to selectively allow peripheral indirect address selection.

FIG. 3 shows a DMA channel 305 which further receives a peripheral supplied address that is input to both the source side 210 and destination sides 215. The DMA channel 305 further includes a peripheral address select register 310. The peripheral address select register 310 may be configured by the user in software. The peripheral address select register 310 is then used to select which bits of the peripheral address are to be used in the destination address. The peripheral supplied address is used when the DMA channel is configured to allow the source or destination address in the dual port RAM 120 to be partially selected by a peripheral. In one implementation, the peripheral supplied address is appended to the based address given by the source address. In another implementation, the peripheral supplied address may substitute respectively designated bits of the address provided by the respective pointer. To this end, each address generating device for the source and the destination comprises, for example, a multiplexer or selector that selects between the respective bits. Thus, depending on how the multiplexer or selector is controlled, the DMA module may operate either in normal mode in which all address generation is provided by simple incrementing or decrementing or in the extended mode in which the address generation is partly controlled by the peripheral.

Figure 4:
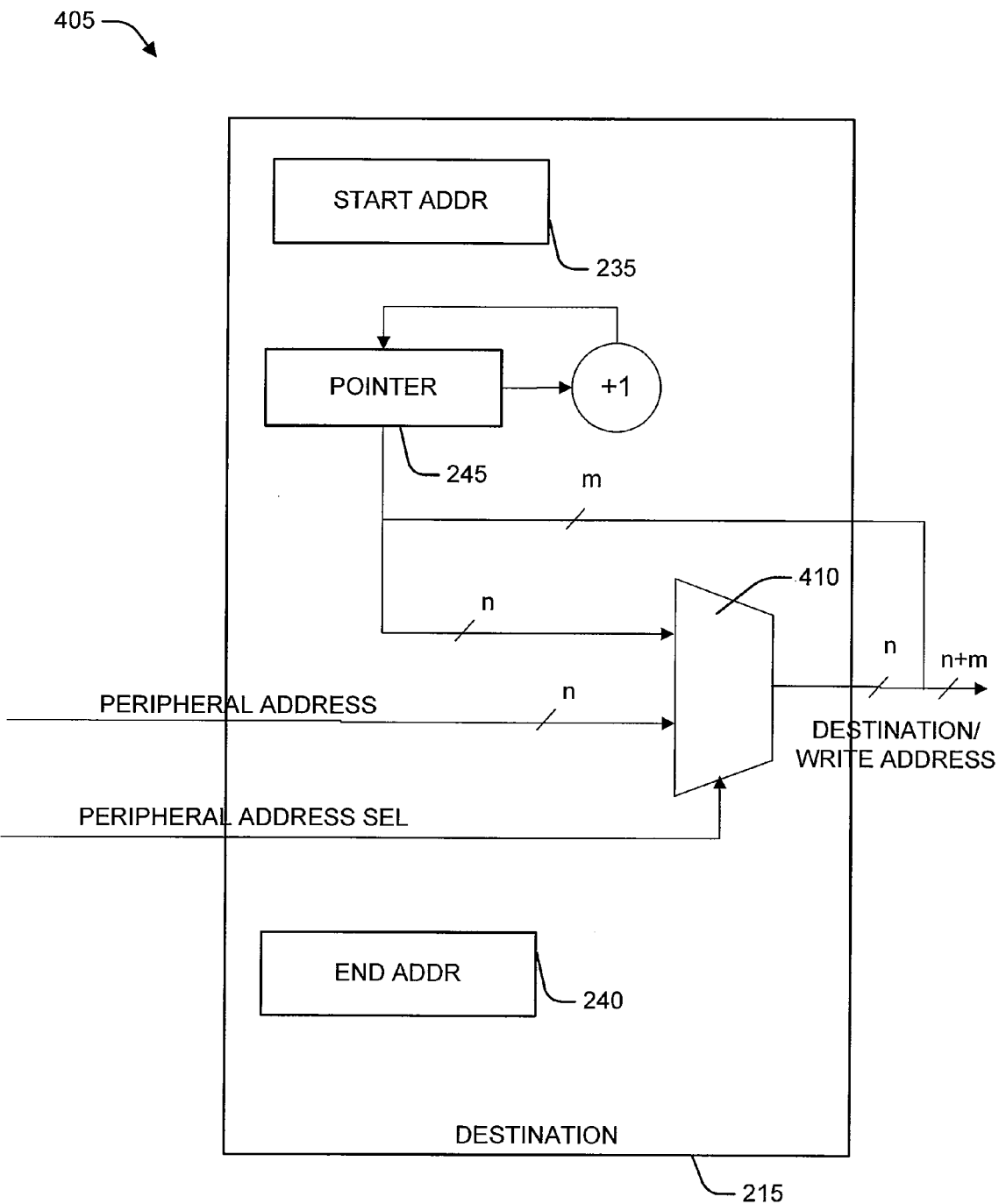
FIG. 4 is a schematic block diagram of a destination side of a DMA channel configured to selectively allow peripheral indirect address selection.

FIG. 4 shows a destination side 215 of a DMA register that is configured to read from the peripheral and write to a specified location in the dual port RAM 120. The multiplexer 410 is added to the destination address path and selects which n bits of the n+m bits of the destination address is selected by the peripheral and which n address bits are selected by the pointer 245. To this end, the multiplexer will receive respective n bits from pointer 245 and the n respective peripheral address bits from the peripheral. The peripheral address select signal which is provided by or derived from the peripheral address select register 310 controls the multiplexer to select the respective multiplexer input. At the output of multiplexer 410 the remaining m address bits from the pointer 245 are added to the n selected bits to form a complete address having n+m bits.

Figure 5:
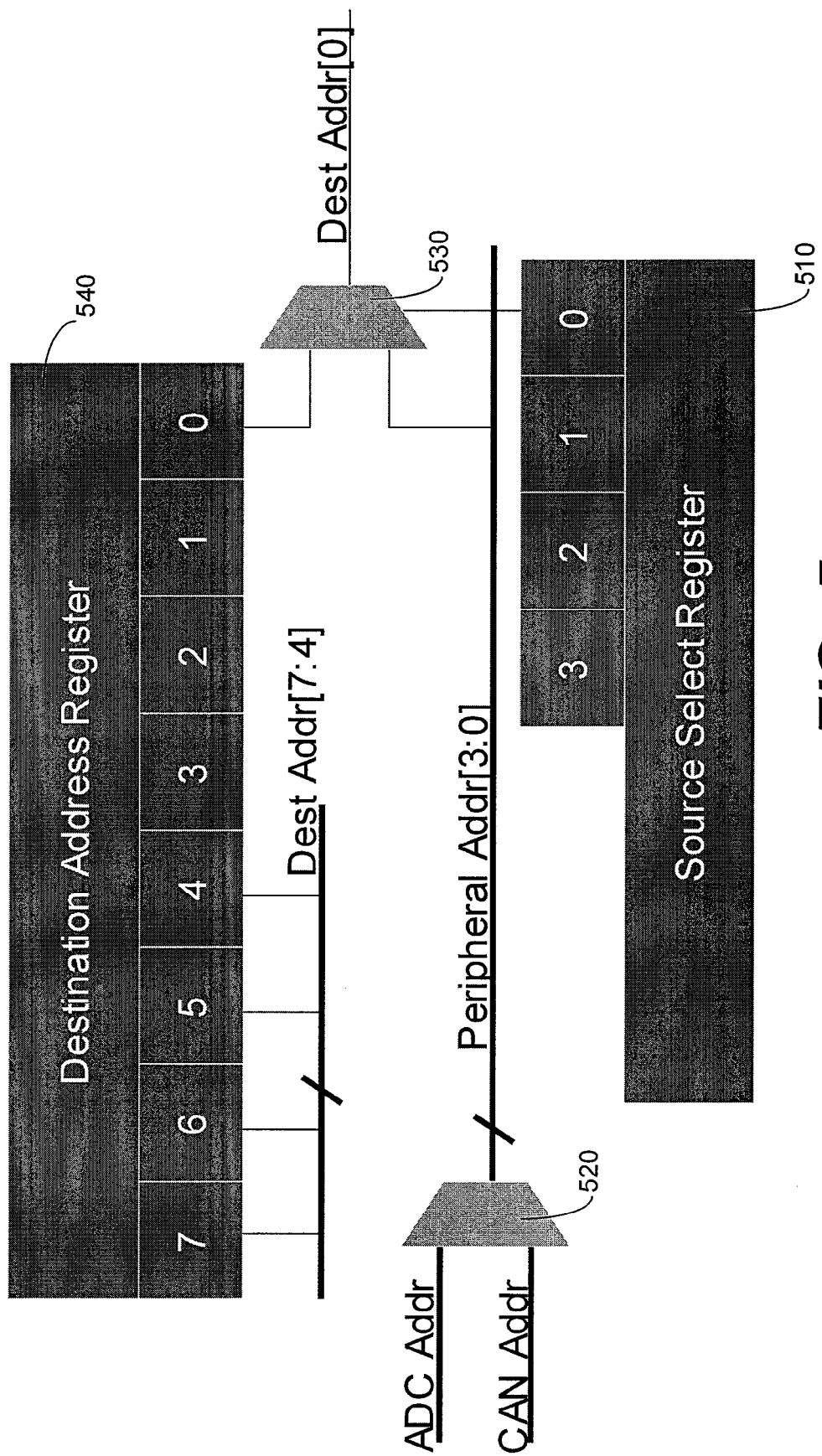
FIG. 5 is a schematic block diagram of a memory addressing system.

FIG. 5 shows an example implementations where a peripheral, such as an ADC or a CAN module selected through multiplexer 520, supplies 4 bits, e.g. bits [0:3], while the destination address register 540 provides the remaining upper 4 bits, e.g. bits [7:4], of the memory address. A further multiplexer 530 is controlled by source select register 510 and selects either the respective bits of the destination address register 540 or the bits provided by the output of multiplexer 520. Only one multiplexer 530 for bit 0 is shown in FIG. 5. Depending on how many bits are provided by the peripheral, a respective number of multiplexers will be provided.

In the case of the CAN module the fourth bit [NUM_BUFFERS:3] of the lower address bits will select the destination buffer and the lowest three bits [2:0] will select which of the 8 16-bit words is currently being loaded with data. Depending on the embodiment, the buffer size (maximum) that a peripheral uses can be significantly greater than in the above mentioned CAN embodiment, for example it may be limited only by the size of the DMA's dual port RAM.

Figure 6:
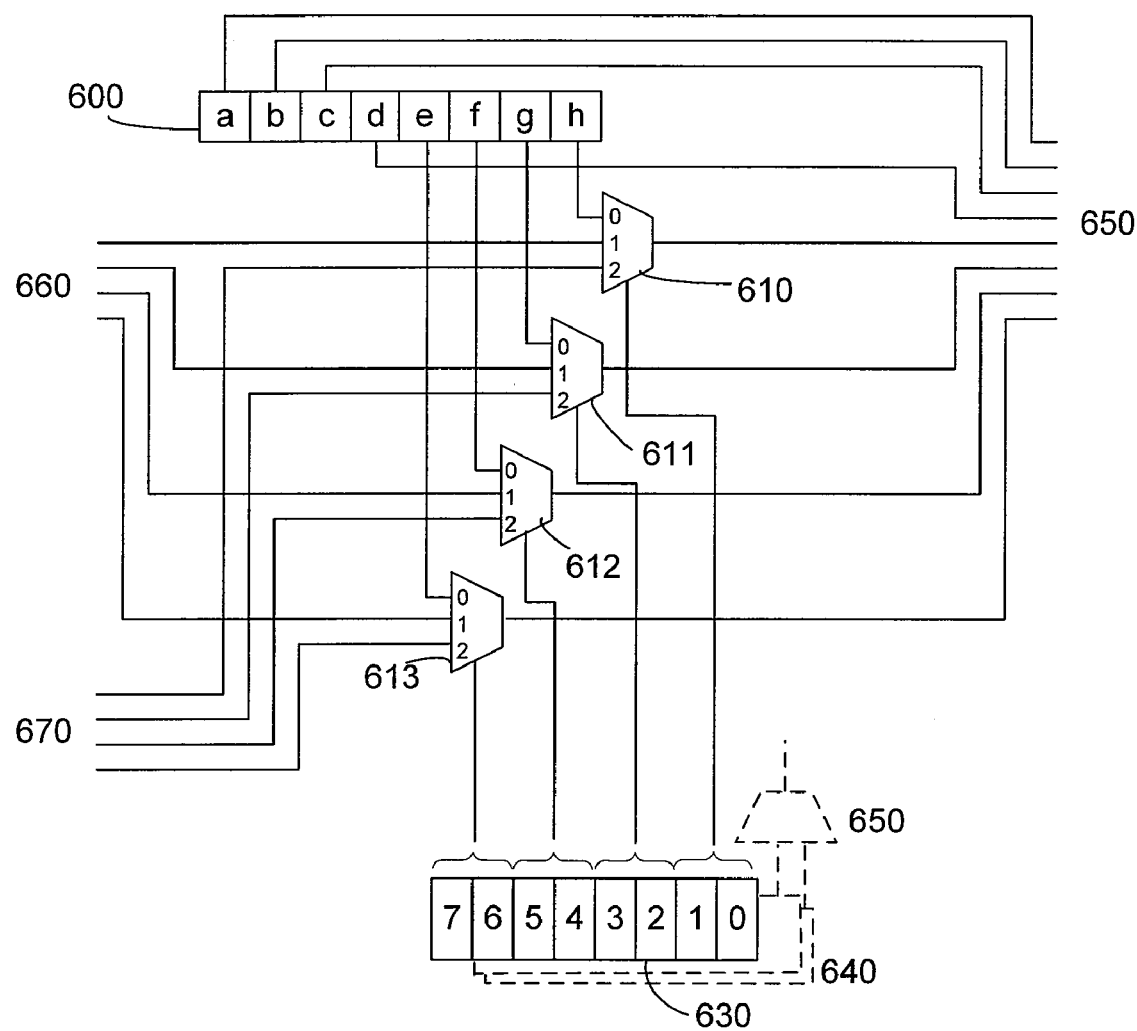
FIG. 6 is a schematic block diagram of another embodiment of a DMA channel.

FIG. 6 shows another embodiment using a different arrangement of multiplexers. Destination address register 600 comprises 8 bits wherein, for example, the upper bits a, b, c, and d are directly fed to output 650. The lower bits e, f, g, and h are fed to the first input 0 of four multiplexers 610, 612, 613, and 614. The second inputs 1 of multiplexers 610, 612, 613, and 614 receive the respective lower address signals from peripheral 660 whereas the third inputs 2 of multiplexers 610, 612, 613, and 614 receive the respective lower address signals from peripheral 670. The outputs of multiplexers 610, 612, 613, and 614 are coupled with output 650 such that a complete address is present at output 650. Source select register 630 provides the control signals for multiplexers 610, 612, 613, and 614. Thus, either the destination address register, the first peripheral 660 or the second peripheral 670 provides the bits for the address output according to its content. For example, source select register 630 has 8 bits 0 . . . 7. 2 bits can select four different inputs of a multiplexer. Thus, bits 0 and 1 are used to control multiplexer 610, bits 2 and 3 are used to control multiplexer 611, bits 4 and 5 are used to control multiplexer 612 and bits 6 and 7 are used to control multiplexer 613. Thus, depending on the content of register 630 which is written in accordance with the specification of the respective coupled peripheral, the multiplexers 610, 612, 613, and 614 select the appropriate input to form the output address at output 650. Each peripheral can furthermore have an associated register as shown by the dotted boxes 640. An additional multiplexer 650 then could select automatically the register associated to the specific peripheral that has been selected for DMA transfer.

One of the advantages of the described embodiments is that the partial address bits which are provided by the peripheral and substitute the respective bits of the destination address register do not have to be continuous. In other words, these bits are not necessarily incremented during a DMA transfer but rather may be out of order. However, if the RAM serves as a buffer in a serial data DMA transfer, these bits can of course be incremented by the peripheral to fill an assigned buffer space within the RAM. Moreover, the partial address substitution allows also for a simple reverse filling in which a buffer is written from the end address to the start address. Thus, any type of in-order or out-of-order transmission can be accomplished depending on the capabilities of the peripheral and the programming of the DMA module.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A direct memory access (DMA) module, comprising:
an address register configured to store a memory address consisting of m least significant bits and n most significant bits, wherein the memory address word size is n+m bits;
a memory port having n+m memory address connections for coupling to a random access memory (RAM), wherein n outputs of the address register are coupled to n respective ones of the memory address connections;
a plurality of multiplexers, each of the plurality of multiplexers having a plurality of inputs and an output, wherein the outputs of the plurality of multiplexers are coupled to m respective ones of the memory address connections and m first inputs of the plurality of multiplexers are coupled to respective ones of m outputs of the address register;

a plurality of peripheral ports, each of the plurality of peripheral ports having m or less than m address connections;

the m or less than m address connections of each of the plurality of peripheral ports are connected to respective ones of the plurality of inputs of the plurality of multiplexers; and an address source select register configured to select appropriate configurations of the plurality of multiplexers so that the m or less than m address connections of the selected one of the plurality peripheral ports are coupled to m or less than m of the memory address connections of the memory port, wherein the peripheral coupled to the selected one of the plurality of peripheral ports controls m or less than m least significant bits of the address connections of the memory port, and the address register controls the address connections not controlled by the peripheral coupled to the selected one of the plurality of peripheral ports.

2. The DMA module according to claim 1, wherein the peripheral is a multi-channel analog-to-digital converter (ADC).

3. The DMA module according to claim 1, wherein the peripheral is a controller area network (CAN).

4. The DMA module according to claim 1, wherein the RAM coupled to the memory port is a dual port RAM.

5. The DMA module according to claim 1, wherein the address register controls addresses for selection of address blocks of the RAM and the peripheral coupled to the selected one of the plurality of peripheral ports controls individual addresses within a selected address block of the RAM.

6. The DMA module according to claim 1, wherein the peripheral coupled to the selected one of the plurality of peripheral ports reads data from the memory port.

7. The DMA module according to claim 1, wherein the peripheral coupled to the selected one of the plurality of peripheral ports writes data to the memory port.

* * * * *